United States Patent [19]
Lefrou et al.

[11] Patent Number: 5,663,829
[45] Date of Patent: Sep. 2, 1997

[54] ELECTROCHROMIC PANE

[75] Inventors: Christine Lefrou, Ivry sur Seine, France; Francis Defendini, Andenne, Belgium; Florence Garot, Neuilly Plaisance; Odile Marrot, Issy les Moulineaux, both of France

[73] Assignee: Saint-Gobain Vitrage International, Courbevoie, France

[21] Appl. No.: 259,683

[22] Filed: Jun. 13, 1994

[30] Foreign Application Priority Data

Jun. 11, 1993 [FR] France ................................. 93 07096

[51] Int. Cl.$^6$ ................................................. G02F 1/153
[52] U.S. Cl. ................................. 359/275; 359/274
[58] Field of Search ........................ 359/265, 269, 359/270, 273, 274, 275

[56] References Cited

U.S. PATENT DOCUMENTS 5,352,504  10/1994  Boulanger et al. ............... 428/216
5,402,144   3/1995  Ripoche ............................ 345/105

FOREIGN PATENT DOCUMENTS

A-0 486 387  11/1991  France .
A-0 509 276   3/1992  Germany .
2 007 864     5/1979  United Kingdom .
9321557      10/1993  WIPO .

OTHER PUBLICATIONS

Stuart F. Cogan and R. David Rauh, "The a-WO$_3$/a-IrO$_2$ Electrochromic System", *Large-Area Chromogenics: Materials and Devices for Transmittance Control*, 22–24 Sep. 1988, vol. IS 4, pp. 482–493.

*Primary Examiner*—Georgia Y. Epps
*Assistant Examiner*—Dawn-Marie Bey
*Attorney, Agent, or Firm*—Oblon, Spivak, McClelland, Maier & Neustadt, P.C.

[57] ABSTRACT

An electrochromic system comprising a transparent electrically conducting film (2), a film (3) of a cathodic electrochromic material, which is capable of reversibly inserting $M^+$ cations of type $H^+$ or $Li^+$, an electrolyte film (5), counter-electrode film (7) made of an anodic electrochromic material, and a second electrically conducting film (8), said structure having a barrier film (6) interposed between electrolyte (5) and the counter-electrode (7), which barrier film is open to the diffusion of the $M^+$ cations and which is constituted of the following materials selected from the group consisting of oxides of metals of Group VB of the Periodic Table, mixtures of these oxides, CeF$_3$, Sb$_2$O$_3$, HUP (hexauranylphosphate), Cr$_2$O$_3$, ZrO$_2$, and an ion conductor material of Li$_3$N, LiTaO$_3$, LiAlF$_4$, Li$_3$PO$_4$, LiBO$_2$ or LiNbO$_3$.

15 Claims, 4 Drawing Sheets

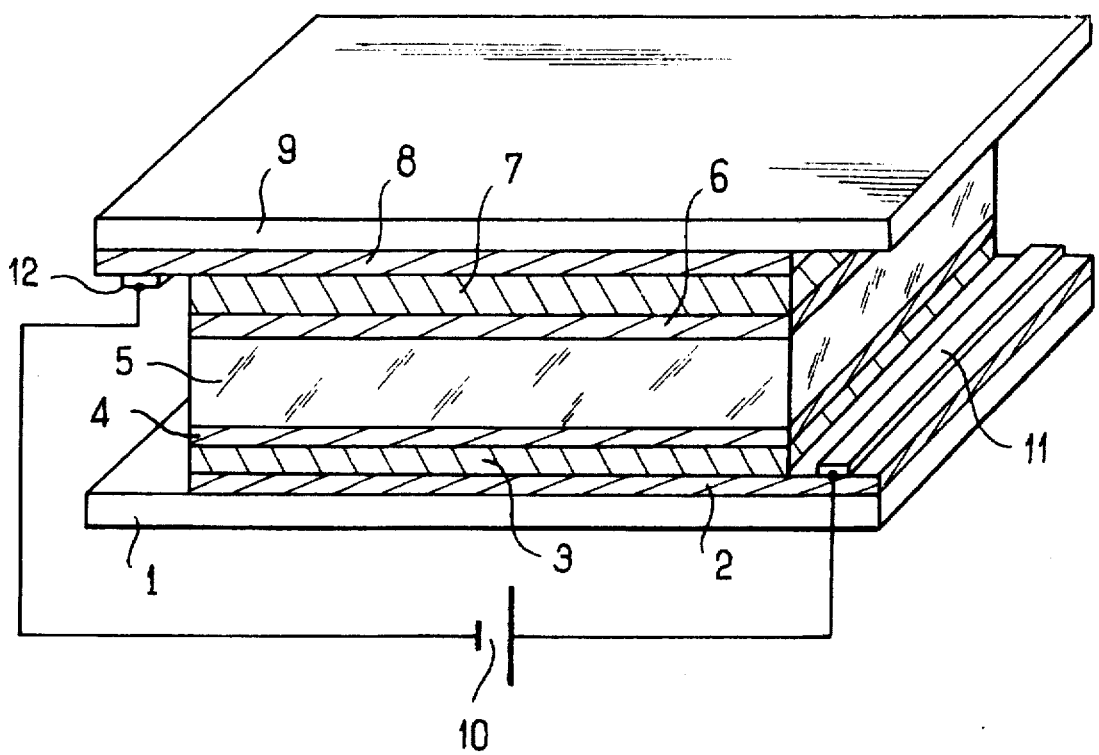
FIG_1

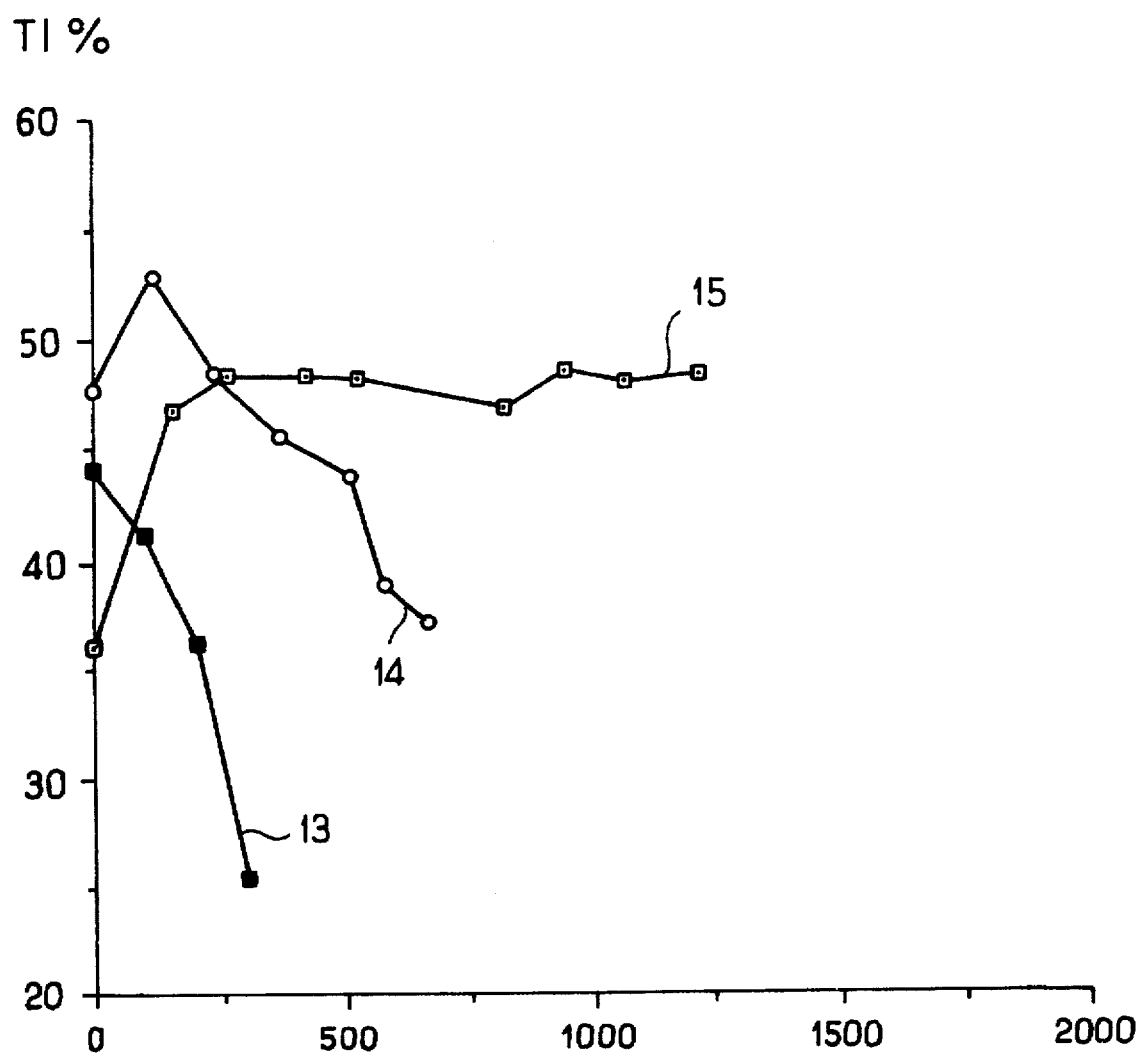
FIG_2

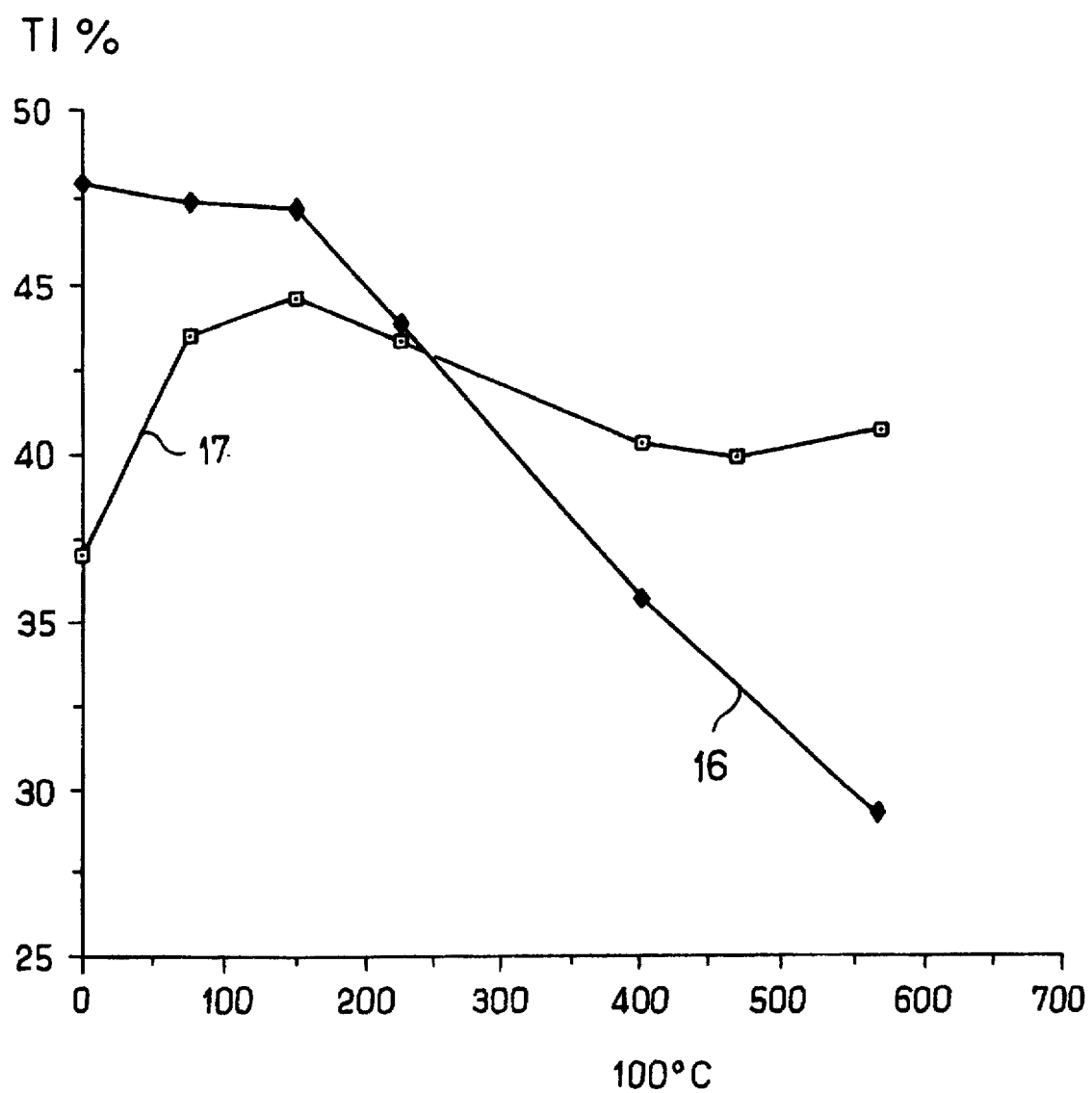
FIG_3

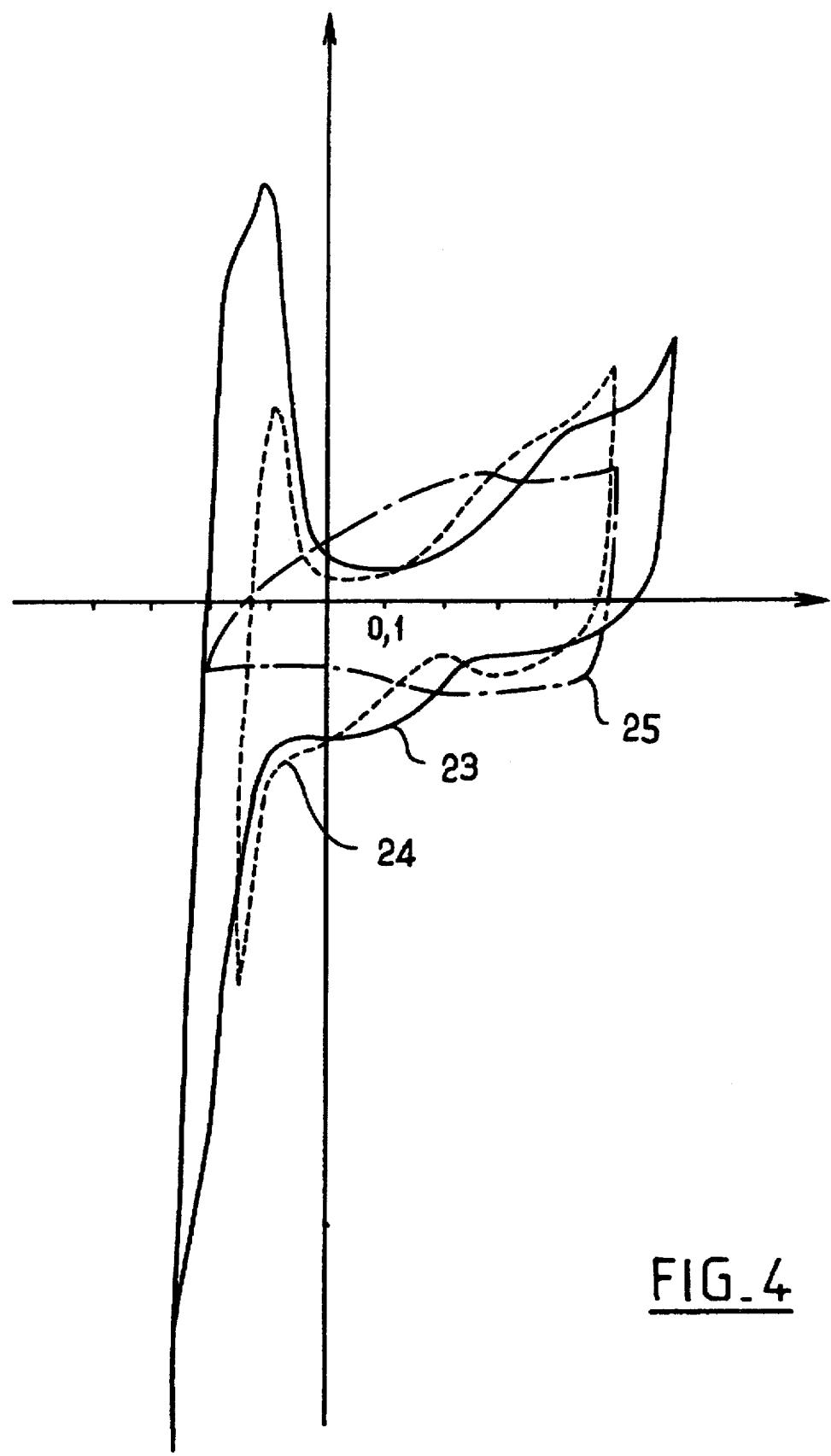
FIG_4

ELECTROCHROMIC PANE

BACKGROUND OF THE INVENTION

1. Field of the Invention

The present invention relates to the field of electrochromic systems, notably panes in which the light transmission can be modulated by means of an electric current. More particularly the invention relates to the control of the solar input into buildings or the passenger compartment of vehicles.

2. Discussion of the Background

It is well known that an electrochromic system comprises a film of a material capable of inserting cations in a reversible manner and the oxidation states which correspond to the inserted and de-inserted states are of distinct colorations, one of the states being generally transparent. The insertion or de-insertion reaction is controlled by the application of a suitable potential difference. The electrochromic material, normally based on tungsten oxide, is brought into contact with an electron source such as a transparent electrically conducting film, and a cation source such as an ion-conducting electrolyte.

Furthermore it is known that, in order to ensure that the electrochromic device has the capability of at least about a hundred switching operations, there must be associated with the electrochromic material film a counter-electrode which is capable, itself of reversibly inserting cations, symmetrically disposed with respect to the film of electrochromic material so that, macroscopically, the electrolyte appears as a simple medium for the cations.

The counter-electrode should be composed either of a film that is neutral in coloration or of a film that is less transparent when the electrochromic film is in the de-colored state. Since tungsten oxide is a cathodic electrochromic material, that is to say its colored state corresponds to the most reduced state, an anodic electrochromic material such as nickel oxide or iridium oxide is generally used for the counter-electrode. It has also been proposed to use a material that is optically neutral in the critical oxidation states, such as for example, cerium oxide or organic materials such as electron conducting polymers of the likes of polyaniline, or Prussian blue.

Such systems make possible a real reversibility of the insertion/de-insertion phenomena, due to the ion source constituted of the counter-electrode.

Nevertheless, it has become apparent that such systems degrade and that, after a certain time, the phenomenon of electrochromism no longer takes place or at least is very clearly weakened, which leads to a reduction or complete suppression of the contrast between the colored state and the de-colored state.

This degradation is demonstrated in three different types of tests:

i) exposure of a system in the de-colored state to ultraviolet rays;

ii) exposure of the system to heat, for example to a temperature of the order of 80° C.; and iii) cycling, a test during which the system is subjected to a very large number of alternating colored and de-colored states.

Surprisingly, for these three tests, the final result is principally the same, although each has a different relative importance and the analysis of the degraded system shows that the degradation essentially results from an irreversible reduction of the counter-electrode, generally to metal which is a non-electrochromic material. This phenomenon is common to practically all of the electrochromic devices based upon polymeric electrolytes, for a very simple reason which will become apparent further on, which conduct protons or lithium ions, the ultraviolet exposure test being the most degrading in the case of the lithium systems.

Although the final result is the same, this may nevertheless not be true for the mechanisms leading to it. Furthermore, the present inventors have found that these degradations are greatly retarded if a barrier film or layer is inserted between the electrolyte and the counter-electrode; in particular a film of $LiNbO_3$ between a lithium electrolyte and a counter-electrode of $LiNiO_y$, or a film of tantalum oxide $Ta_2O_5$ or of niobium oxide $Nb_2O_5$ between a protonic electrolyte and a counter-electrode of $H_xIrO_y$.

The barrier film interposed between the electrolyte and the counter-electrode should be open to the cations of the electrolyte which are protons or cations of alkali metals which it is desired to insert or de-insert into and out of the two films of electrochromic materials. Moreover, the barrier film is preferably transparent in order not to reduce the light transmission of the system and should have a good chemical resistance with respect to the electrolyte, which implies, notably, a good resistance in acid medium in the case of the protonic systems, and in neutral medium in the case of the lithium systems.

On the other hand, this barrier film is preferably a filter that opposes the passage of ionic or gaseous species transported by the electrolyte, with the exception, of course, of the cations, and more especially a filter of the anions and the gases that may be present in the system, which are imprisoned during the assembly or formed as a consequence of parasitic degradation reactions.

In addition, this barrier film is preferably such that it increases the formation overvoltage of reducing agents at the interface between the electrolyte and the counter-electrode of anodic electrochromic material.

Finally, the barrier film is preferably an electron isolating film.

In order to understand what may be the role, or more exactly the roles, of this barrier film, it is advantageous to analyze the phenomena that are likely to occur during the course of these three different tests. In order to assist in clarifying the explanation, reference is made to a system containing an electrode based upon tungsten oxide $WO_3$ and a counter-electrode of iridium oxide $H_xIrO_y$, but this explanation may be generalized to all the electrochromic materials with anodic coloration.

When the system is subjected to the UV test in an open circuit, bluing is first observed in the de-colored states, or in other words, cations are inserted into the film of tungsten oxide. Such a bluing is not observed in the other two tests. Nevertheless, this bluing is perfectly reversible and it is only necessary to subject the system to a normal decoloration voltage to cause this blue tint to disappear, thereby restoring the system to one having a contrast as good as the initial contrast.

It is known that $WO_3$ is a semiconductor material of type n, that is, upon the conduction of electrons. When the semiconductor is irradiated the electrons may pass through the conduction band and thus facilitate oxidation reactions. In contrast, iridium oxide, like the majority of the counter-electrode materials of anodic coloration, is a semiconductor of type p, which conducts by holes, with the result that when the counter electrode is exposed to photons, the effect is to facilitate reduction reactions. By subjecting the $WO_3/HIrO_2$ system to ultraviolet radiation, oxidation reactions may be expected for $WO_3$ and reduction reactions for the counter-electrode.

No electrochromic system is perfectly anhydrous. However, many precautions are taken to eliminate every trace of water from such systems. Thus, in the preparation of an electrochromic device the $WO_3$ film is hydrated during the course of its deposition and/or by handlings of the film before assembling which normally pass the film through open air, which is of necessity always humid. Furthermore, the proton or lithium electrolytes always have a residual humidity content, which may be maintained with difficulty at less than a few 100 ppm. The most probable oxidizing agent at the $WO_3$ side of the system is residual water. What results is essentially a battery, which exhibits the following equilibrium reactions:

  (1)

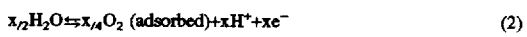  (2)

with the net equation being:

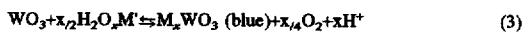  (3)

where M is either H or Li.

The zero current potential of equilibrium (2) is shifted towards the negative potentials by reason of the photosensitivity of tungsten oxide, so that the reduction of $WO_3$ to $M_xWO_3$(M=H, Li) is favored. Conjointly, oxygen is generated on this same electrode.

It is hypothesized that the quantity of oxygen thus formed is sufficiently small and it is partially absorbed by the polymeric electrolyte, which explains the absence of the formation of bubbles, at any rate in the short term.

In practice, a stable coloration state is reached only after a few hours, and its degree of intensity at equilibrium depends upon the wavelength of the radiation. This radiation is effective in the near UV for wavelengths corresponding to the visible. It is therefore possible to limit the bluing, but not to suppress it entirely, by means of a UV filter.

In any case as indicated above, it is not at the tungsten oxide side but at the iridium oxide counter-electrode side that the system degrades irreversibly. The colored state, that is the inserted state, corresponds to an oxidation degree III. The degraded state indicates a passage to degree 0, but nevertheless the equilibrium between degree III and degree 0 is described in the literature as very improbable.

In the case of the protonic systems, it has been proposed that the following equilibriums exist in a battery situation:

  (4)

  (5)

with the net reaction being:

  (6)

This reaction is followed by the reduction of Ir (IV) to Ir (O), for example by hydrogen:

  (7)

The net reaction of reactions (6) and (7) is:

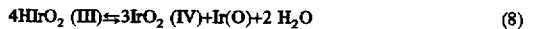  (8)

It should be noted that the equilibrium reactions proposed here are probably not the only ones which occur, particularly since the measured ratio Ir(IV)/Ir(O) appears to be much less than 3. It is therefore possible that the reduction of iridium oxide to the 0 valent state is attributable also to reducing agents other than hydrogen, or that the latter is formed also by other routes. Polymeric degradation products in particular are capable of playing a part in these mechanisms.

In the case of systems containing lithium, with a counter-electrode of the $AO_y$ type, wherein A is, for example, Ni, Ir or V, it is probably possible also to write the following equilibrium reactions:

  (9)

  (10)

Apart from this, the mechanisms that are proposed appear also to be applicable basically to the systems that rely upon the insertion/de-insertion of alkali metal cations. It is then possible to rewrite all the above equilibrium reactions. A need continues to exist for an electrochromic device which exhibits improved stability.

SUMMARY OF THE INVENTION

Accordingly, one object of the present invention is to provide an electrochromic system of improved stability.

Briefly, this object and other objects of the present invention as hereinafter will become more readily apparent can be attained by an electrochromic system comprising a transparent electrically conducting film (2), a film (3) of a cathodic electrochromic material, which is capable of reversibly inserting, $M^+$ cations of type $H^+$ or $Li^+$, an electrolyte film (5), a film of a counter-electrode (7) made of an anodic electrochromic material and a second electrically conducting film (8), said structure having a barrier film (6) interposed between the electrolyte (5) and the counter-electrode (7), which barrier film is open to the diffusion of the $M^+$ cations and which is constituted of the following materials: oxides of Group VB of the Periodic Table and more especially $Ta_2O_5$ and $Nb_2O_5$, or mixtures of these oxides, such as for example niobium/tantalum oxides, $CeF_3$, $Sb_2O_3$, HUP (hexauranylphosphate), $Cr_2O_3$, $ZrO_2$, or of an ion conductor of type $Li_3N$, $LiTaO_3$, $LiAlF_4$, $Li_3PO_4$, $LiBO_2$ or $LiNbO_3$, more particularly in the case where M=Li.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a diagram of the electrochromic system according to this invention;

FIG. 2 is a graph which illustrates the variation in light transmission in the de-colored state as a function of the number of hours of exposure to intense ultraviolet sources;

FIG. 3 is a graph which illustrates the variation in light transmission in the de-colored state as a function of the number of hours during which the system was raised to a temperature of 100° C.; and FIG. 4 shows voltamogrammes of films of iridium oxide in different systems, after 600 hours at 100° C.

DETAILED DESCRIPTION OF THE PREFERRED EMBODIMENTS

Although the mechanisms proposed above may not be unique, it is clear that in the case of the UV test the degradation mechanism is essentially a photoelectrochemical mechanism. This hypothesis is further reinforced by the finding that degradation is accelerated when the films of electrochromic materials are placed electrically in contact through the intermediary of the peripheral seal.

In comparison to these mechanisms the barrier film must fulfil different roles. First of all, it has been shown above that the reduction of the counter-electrode, in particular of the iridium oxide into metallic iridium, both for the systems with lithium conduction and for the protonic systems, is probably due to the formation of hydrogen (equation [4]). Since the principal source of the hydrogen is the electrolyte, through the intermediary of $H^+$ or residual $H_2O$, this formation should take place at the interface between electrolyte/iridium oxide. The barrier film will principally have, as its function, limitation of the formation of hydrogen by increasing the hydrogen release overvoltage. From the discussion above about the photoelectrochemical character of the degradation mechanism, it is apparent that this barrier film should advantageously be an electron isolator and should aid in preventing any short circuit between the electrochromic films. In addition, and in so far as gaseous hydrogen may alone not be responsible for the degradation of the counter-electrode, it is preferred that the barrier film oppose the passage of all the species that may be present or passing through the electrolyte, with the exception of the cations, i.e., protons or lithium ions which are inserted/de-inserted into the electrochromic materials.

It has been shown that the barrier film advantageously also is a filter to all the species transported except the electrolyte cations. It is, moreover, advantageous that the barrier film act also as a filter for all the gases that may form, and most notably, with respect to hydrogen. As mentioned above, the barrier film is such that it increases the hydrogen release overvoltage, formed by the reaction $H \rightleftharpoons H_2$ in protonic medium or $H_2O \rightleftharpoons H_2$ for the lithium media, at the electrolyte/counter-electrode interface. But it may again be further emphasized that hydrogen may perhaps form at other locations in the system. In particular, because of the photosensitivity of $WO_3$ when exposed to UV, the zero current potential of the reduction reaction for the protons into hydrogen (equilibrium [4]) is offset towards the positive potentials; hydrogen may then probably be formed at the $WO_3$ side and diffuse in the absence of a barrier film towards the counter-electrode.

The reactions set out above are for the most part photoelectrochemical. Now as already indicated the degradation of the system also taken place in the absence of protons, after thermal tests or cycling tests. The degradation mechanisms are then of necessity different. Without going further into detail, it is possible that, in the case of an exposure to high temperature, reducing products form, notably, as a result of a degradation of the electrolyte or of traces of residual impurities linked to the synthesis reducing products which are responsible for the reduction of the counter-electrode, in particular of iridium oxide into metallic iridium. For the cycling tests, the degradation is probably more of an electrical nature, because, in contrast to the preceding cases, a potential is now applied between the two films of electrochromic materials. For whatever the reasons it is found that barrier films which are effective from the view of the UV test, also enable improvement of the performances characteristics of the films under the other two tests.

As protective film it is especially advantageous to use a dielectric metallic oxide, which is a material known for its permeability to protons or other cations of alkali metals and which, moreover, is a good electron insulator. In the case of the protonic conduction systems, the protonic conductor dielectric materials, pure and acid-resistant, represent good barrier layers.

For its resistance in acid media and the ease with which it can be deposited in thin films according to the techniques already used for electrochromic films, tantalum pentoxide $Ta_2O_5$ is normally chosen, preferably in a thickness of between 1 and 500 nanometers and more preferably between 20 and 120 nanometers. Too small thicknesses are usually avoided, because of the difficulty of depositing them uniformly, without discontinuity of the film, on surfaces that are as large as building panes, for example. The thickest films add an ohmic resistance which is non-negligible and is undesired.

More generally, the materials that are suitable for barrier films are dielectric materials, such as the oxides of column VB of the periodic table especially, $Ta_2O_5$ and $Nb_2O_5$, and mixtures of the oxides, fluorides such as $MgF_2$, $CeF_3$ and also materials such as $Sb_2O_3$, HUP (hexauranylphosphate), $Cr_2O_3$, $SiO_2$, $ZrO_2$.

In the case of the lithium conduction systems, lithium conduction mineral films that are pure and stable in neutral media are claimed. The materials of the type $Li_3N$, $LiAlF_4$, $LiTaO_3$, $Li_3PO_4$, $LiBO_2$ and, more especially, $LiNbO_3$, are good barrier films with respect to the degradation phenomena mentioned in thicknesses generally between 1 and 500 nanometers.

Within the scope of the present invention, it is preferred that the film constituting the counter-electrode should be an anodic electrochromic material, notably based upon iridium oxide of the type $H_xIrO_y$, in the case of a proton conduction, or based upon nickel oxide. What has been found very surprising is that, as a result of the barrier films according to the invention, it has been possible to use not only nickel oxide for conduction of $Li^+$ cations, which is known, but also for a proton conduction. In fact, it is known that nickel oxide is extremely sensitive to acid attack and has a tendency to deteriorate and to dissolve on contact with protons. The fact that a barrier film, which clearly does not impede the transfer of protons, can prevent the degradation of nickel oxide is still difficult to explain. It may be thought that this degradation is not in fact solely due to contact with protons, but perhaps to other elements which the film is capable of "filtering". In any case, the present invention thus enables the use of counter-electrodes based upon nickel oxide to be broadened.

Moreover, as constituent materials for the electrically conducting films, doped metallic oxides are preferably chosen, such as tin oxide doped with fluorine $SnO_2$:F or indium oxide doped with tin ITO. In the latter case it is frequently recommended to "protect" the ITO film by a fine protective film of the tin oxide type. It has been found, also unexpectedly, that it is possible in fact to omit this protective tin oxide film without however leading to deterioration of the ITO provided that a second barrier film is added of the same type and characteristics as the first, but in this case interposed between the cathodic electrochromic material and the electrolyte. This second barrier film may thus, firstly, prevent any risk of dissolving or deterioration of the electrochromic material with which it comes into direct contact and, subsequently and indirectly, fulfil a protective role for the conductive films of ITO, without, the phenomena involved being yet completely explained.

Referring now to FIG. 1 a stack is shown an example of an electrochromic system according to the present invention.

From the bottom upwards, the system thus comprises a transparent substrate (1), preferably of glass or any other material suitable for withstanding appreciable heating, a transparent electrically conducting film (2) having high electron conductivity, for example formed of a film of tin oxide doped with fluorine or a film of indium oxide doped with tin (ITO film) on which is deposited a protective film of tin oxide as taught by Patent Application EP-486 387, a film (3) based upon tungsten oxide, termed $WO_3$ film, a film of an electrolyte (5) of the proton-conducting or ion-conducting polymer type, a film termed "barrier or protective" film according to the invention (6), a counter-electrode in which the present case is constituted of a film based upon iridium oxide (7), termed $IrO_2$ films, another transparent electrically conducting film (8) analogous to film (2), and a substrate (9). The optional film (4) between the film (3) based upon tungsten oxide and the electrolyte film (5) is a "barrier" film of the same nature as film (6).

The system thus constructed is, in addition, equipped with an electrical supply device comprising, notably a voltage generator (10) which enables a voltage to be applied across the terminals of the system by means of conducting strips (11) and (12), situated at opposite ends of the two electrically conducting films (2) and (8).

Precise indications about the methods of construction of such systems are given, notably, in European Patent Applications 338 876, 408 427, 475 847, 477 065, 486 387 to which reference may be made for further details.

The barrier films (4), (6) are films of tantalum oxide $Ta_2O_5$, of a thickness of the order of 0.040 micron, produced by magnetron sputtering from a target of metallic tantalum in an argon/oxygen plasma (40% oxygen by volume), under a pressure of 5,000 Pa. It should be noted that the film deposited under such conditions appears relatively substoichiometric, the tantalum having probably a degree of oxidation less than 5.

Various electrochromic systems with or without barrier or protective films, but otherwise rigorously identical, have been subjected to aging tests under ultraviolet radiation and at high temperature the system being tested "abandoned", from an initial de-colored state without coloration/decoloration cycling. In other words, the $WO_3$ film is initially in the de-inserted state whereas, in contrast, the $IrO_2$ film is protonized.

FIG. 2 shows the evolution of the curve showing the light transmission of the system when it is illuminated by a UV lamp with radiation at 340 nm of 0.55 $Wm^{-2}nm^{-1}$, corresponding to a temperature of a thus illuminated black panel of 89° C. Curve 13, (solid square dots) was produced with a system comprising a relatively electrically conducting peripheral seal, so that at rest the $WO_3$ and $IrO_2$ films are substantially at the same potential. After approximately 250 hours the system light transmission $T_L$ is no more than of the order of 25% and, in particular, the system degrades to a point such that switching becomes impossible. That is, coloration is no longer reversible by application of a potential difference.

Curve 14 (round open dots) corresponds to a system having a seal with low electrical conductivity. In this case it is found that the light transmission of the system increases during the first few hours of the test and then decreases as in the preceding case, complete degradation being obtained after approximately 600 hours, and satisfactory levels of light transmission being still obtained after approximately 500 hours. The peak of the first hours represents a kind of formatting of the system, probably due to the insertion of protons in the $IrO_2$ film. This phenomenon is well known and is generally observed in parallel during the first switching of a new system, the insertion capacity of the $IrO_2$ film improving at the start of cycling. It is, in contrast, more surprising not to have observed it in the case of curve 13. It is hypothesized that, in that case, the short-term degradation mechanisms are already important and mask the gain of formatting. The reduction of the iridium oxide in the case of curve 13 being favored by the oxidation of the water at the tungsten oxide side.

In any case, even though the improvement is noticeable, the complete destruction of the system is found after rather more than 600 hours and the system exhibits inferior performance after only about 100 hours. This is not the case if, in accordance with the invention and as illustrated in curve 15, a tantalum oxide film 6 is interposed between the electrolyte 5 and the counter-electrode 7 of iridium oxide.

In conclusion, it is clear that the insertion of a protective film at the iridium oxide side very substantially improves the UV resistance of the system.

The second aspect of the "aging" of the electrochromic systems is illustrated by the evolution of the light transmission in the de-colored state when the system is raised to a high temperature, for example of 100° C. Curves 16, 17 shown in FIG. 3 are characteristic of a system without a protective film (curve 16) or with a protective film at the iridium oxide side (curve 17). After 200 hours, the system without the protective film commences to degrade and the loss of light transmission increases very rapidly. In the case of a system protected according to this invention in contrast, good levels of light transmission are still obtained after 500 hours, the degradation of the performances of the systems taking place at a much slower rate.

Another way of illustrating the invention is to compare the insertion capacities after cycling of non-protected systems, protected by a barrier film according to the invention or again "protected" by a film of tantalum oxide disposed, not on the side of the counter-electrode but on the $WO_3$ side. FIG. 4 shows the voltamogrammes (the potentials being measured with respect to a reference electrode (saturated calumel) of three films of iridium oxide measured after opening of a system placed for 600 hours at 100° C. Curve 23 corresponds to a non-protected system, without a $Ta_2O_5$ film curve 24 to a system provided with a "protective" film at the interface between tungsten oxide and electrolyte, without a barrier film disposed according to this invention, and curve 25 to a system according to this invention provided with a $Ta_2O_5$ film at the interface between iridium oxide and electrolyte.

Curve 23 shows very important peaks which indicate the presence of parasitic chemical reactions (in the present case electrolysis of water with, at bottom left, a peak probably corresponding to the reduction $H \leftrightarrows H_2$ and, at top right, to the oxidation $H_2O \leftrightarrows O_2$). In other words, the insertion capacity of such a film is virtually nil. The same is true also for curve 24, where it can be seen also that the peak corresponding to the reduction reaction of water to hydrogen is around −0.1 volts, whereas in the non-"protected" system 23 this peak is at −0.2 volt. In other words, the "protective" film, if placed solely at the interface between the tungsten oxide and the electrolyte, has no effect.

In contrast, curve 25 is very "square" and demonstrates that, by keeping within potential limits of between, for instance, −0.2 volt and +0.5 volt, no parasitic reaction at all harms the de-insertion/insertion reactions.

With regard to the cycling tests, a cell without a barrier film according to the invention starts to degrade after a few hundreds of cycles, for temperatures above 50° C., whereas, as in the same cycling conditions no degradation is observed with a system according to this invention, even after several thousand cycles.

It should be noted that the electrochromic system according to the invention may also contain a second protective film (4), for example of $Ta_2O_5$ type, incorporated between the tungsten oxide film (3) and the electrolyte film (5). This supplementary protective film makes it possible, on the one hand, to improve still further the cycling performances at high temperature, by preventing the dissolving of the tungsten oxide in the electrolyte. On the other hand, its presence may allow the possibility of eliminating the fine tin oxide film over the electrically conducting film (2) of ITO, without this leading to significant degradation of the latter. It has thus been possible to verify that the stack comprising two barrier films of $Ta_2O_5$ using conducting films of ITO without overlying films of $SnO_2$ has durability, and notably a resistance, at temperature, at least as good as the stack provided with a single film of $Ta_2O_5$ at the counter-electrode side and using films of ITO with overlying films of $SnO_2$ (resistance of at least several hundred hours at 100° C.).

Having now fully described the invention, it will be apparent to one of ordinary skill in the art that many changes and modifications can be made thereto without departing from the spirit or scope of the invention as set forth herein.

French priority application 93/07096 filed Jun. 11, 1993 is hereby incorporated by reference.

What is claimed as new and is desired to be secured by Letters Patent of the United States is:

1. An electrochromic system comprising a transparent electrically conducting film (2), a film (3) of a cathodic electrochromic material, which is capable of reversibly inserting $M^+$ cations of the type $H^+$ or $Li^+$, a lithium or proton conducting, polymeric electrolyte film (5), counter-electrode film (7) made of an anodic electrochromic material, and a second electrically conducting film (8), said structure having a barrier film (6) interposed between electrolyte (5) and the counter-electrode (7), said barrier film permitting the diffusion of the $M^+$ cations and which is a substance selected from the group consisting of $Nb_2O_5$, $CeF_3$, $Sb_2O_3$, HUP, $Cr_2O_3$, $ZrO_2$, $Li_3N$, $LiTaO_3$, $LiAlF_4$, $Li_3PO_4$, $LiBO_2$ and $LiNbO_3$.

2. The electrochromic system according to claim 1, wherein said barrier film (6) is transparent.

3. The electrochromic system according to claim 1, wherein said barrier film (6) is resistant in acid medium ($M^+=H^+$) or in neutral medium ($M^+=Li^+$).

4. The electrochromic system according to claim 1, 2 or 3, wherein while being open to the diffusion of $M^+$ cations, said barrier film (6) is a filter to ion or gaseous species transported in the electrolyte.

5. The electrochromic system according to claim 1, wherein said barrier film (6) is of a material which increases the overvoltage of reducing agents at the interface between the electrolyte (5) and the counter-electrode (7).

6. The electrochromic system according to claim 1, wherein said barrier film (6) is made of an electron insulating material.

7. The electrochromic system according to claim 1, wherein the barrier film has a thickness of from 1 to 500 nanometers.

8. The electrochromic system according to claim 7, wherein said barrier film thickness ranges from 20 to 120 nanometers.

9. The electrochromic system according to claim 1, wherein the electrolyte is a proton-conducting material, the counter-electrode (7) is based upon iridium oxide of the $H_xIrO_y$ type or based upon nickel oxide of the $H_xNiO_y$ type.

10. The electrochromic system according to claim 1, wherein the electrolyte is a lithium-conducting material, and the counter-electrode (7) is based upon nickel oxide of the type $Li_xNiO_y$.

11. The electrochromic system according to claim 1, which further comprises a second barrier film (4) interposed between the film of cathodic electrochromic material (3) and the electrolyte (5).

12. The electrochromic system according to claim 1, wherein said barrier film is one of said ion conductors in the instance where $M^+=Li^+$.

13. The electrochromic system according to claim 1, wherein the electrically conducting films (2, 8) are of tin oxide doped with fluorine ($SnO_2$:F) or of indium oxide doped with tin (ITO).

14. The electrochromic system according to claim 13, wherein the electrically conductive film is overlain by a film of tin oxide.

15. An electrochromic system comprising a transparent electrically conducting film (2), a film (3) of a cathodic electrochromic material, which is capable of reversibly inserting $M^+$ cations of the type $H^+$ or $Li^+$, a lithium or proton conducting, polymeric electrolyte film (5), counter-electrode film (7) made of an anodic electrochromic material, and a second electrically conducting film (8), said structure having a barrier film (6) interposed between electrolyte (5) and the counter-electrode (7), said barrier film permitting the diffusion of the $M^+$ cations and which is a $Ta_2O_5$ layer having a thickness ranging from 40 to 120 nm.

* * * * *